United States Patent Office 3,066,985
Patented Dec. 4, 1962

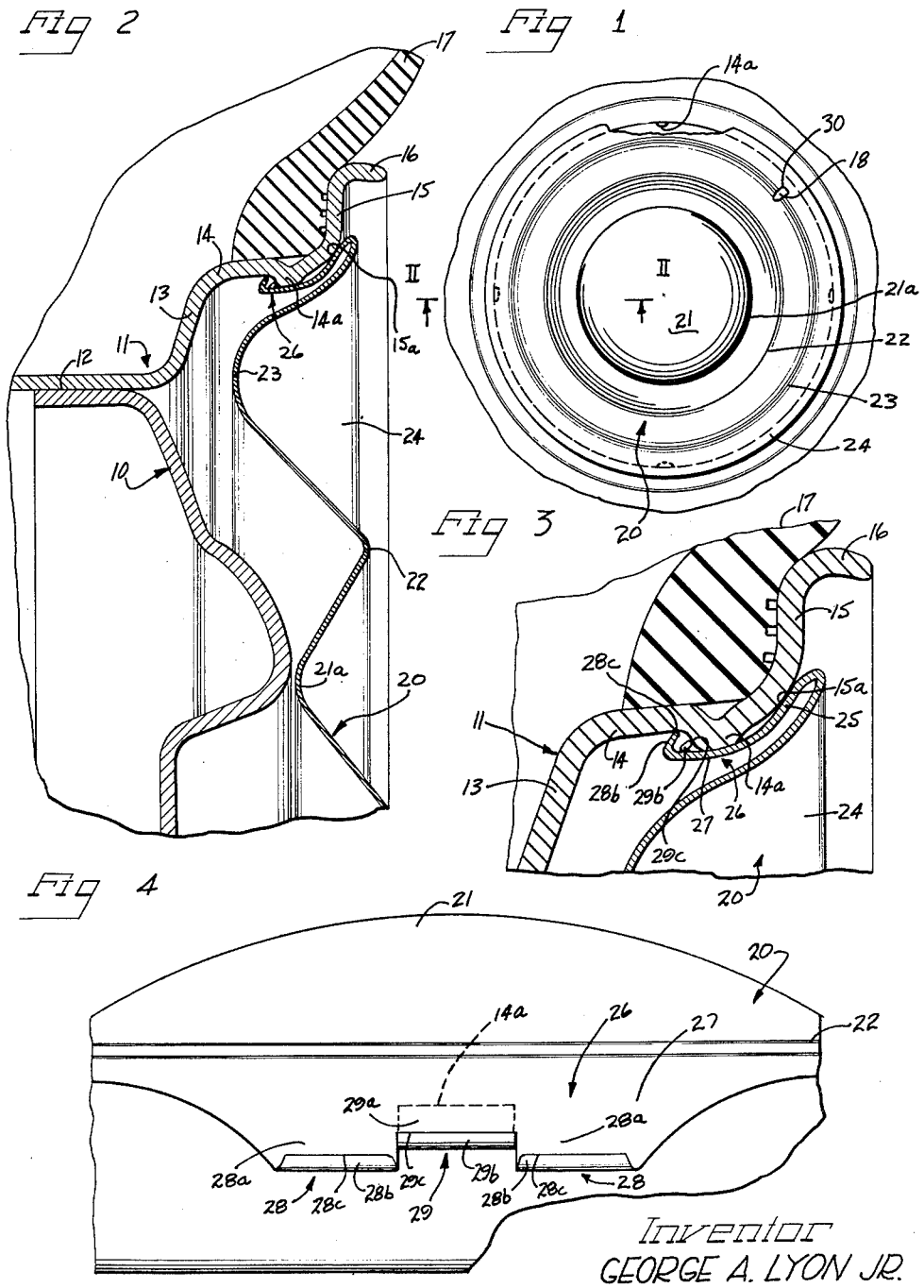

3,066,985
WHEEL COVER
George A. Lyon, Jr., 13881 Chicago Blvd., Birmingham 28, Mich.
Filed Aug. 21, 1958, Ser. No. 756,353
1 Claim. (Cl. 301—37)

The present invention relates to improvements in wheel structures and more particularly concerns a new and improved wheel cover construction for protective retained disposition upon the vehicle wheel.

Consideration is now being given to the manufacture of wheel covers from aluminum materials and the like in the motor car industry. As is known, aluminum is a less expensive material. Also, aluminum wheel covers or aluminum alloy wheel covers comprise a considerably softer material than stainless steel. It will therefore be appreciated that new problems arise where wheel covers are to be manufactured from aluminum or aluminum alloy materials with regard to the retention of such wheel covers upon a vehicle wheel. Spring steel wheel covers having spring steel retaining means permit the cover to be sustained upon the vehicle as a consequence of the resilient deflection of the retaining means. Since aluminum or aluminum alloy materials do not possess the same degree of resiliency as spring steel compensation must be made for this fact where the covers are to be made from aluminum or aluminum alloy. To this end, new and improved retaining means has been developed for an aluminum or aluminum alloy type of wheel cover.

The retaining fingers on the present cover construction have been configurated in a manner whereby the surface area engaged against the wheel of each of the retaining fingers has been materially increased on a unit basis.

Accordingly, an important object of the present invention is to provide a new and improved wheel cover construction adapted to retain itself upon the wheel and comprised of an aluminum composition material or the like.

Still another object of the present invention is to provide a new and improved wheel cover construction which may be manufactured at reduced cost on a large production basis.

Still another object of the present invention is to provide a new and improved retaining finger construction which when engaged upon the wheel has an increased resistance factor to be accidentally displaced from the wheel.

According to the general features of the present invention there is provided a wheel cover having circumferentially spaced deflectable retaining extensions or fingers engaged with the intermediate rim flange and with the bumps, the extension including an axial extension portion, the axially inner end of the axial extension portion being turned and providing a series of radially and axially outwardly extending return bent portions each having biting gripping edges with one of the edges engaged behind and against the bump on the tire rim and with the other edges engaged with the intermediate rim flange on circumferentially opposite sides of the bump, the edge engaged against the bump being disposed axially outwardly or forward of the other edges on the returned bent portions.

Still another specific feature of the present invention relates to the return bent portion which has its edge engaged against the bump being shorter and stiffer than the other of the returned bent portions on each of the extensions or fingers.

Other objects and features of the present invention will more fully appear in view of the following detailed description taken in conjunction with the accompanying drawings illustrating therein a single embodiment and in which;

FIGURE 1 is an enlarged front elevation of a wheel structure according to the principles of the present invention;

FIGURE 2 is an enlarged fragmentary cross-sectional view taken substantially on the line II—II of FIGURE 1 looking in the direction indicated by the arrows;

FIGURE 3 is an enlarged fragmentary cross-sectional view similar to FIGURE 2 only with certain details omitted and with other details being blown-up; and FIGURE 4 is an enlarged fragmentary edge elevation of the wheel cover.

Referring to the drawings, an automobile wheel including a disc spider wheel body 10 supports a tire rim 11 at welded junction 12 between the body 10 and rim 11. The rim 11 includes a generally radially extending rim flange 13, an intermediate generally axially outwardly extending rim flange 14, a generally radially outwardly extending rim flange 15, and a generally axially outwardly extending terminal rim flange 16. Mounted upon the intermediate rim flange 14 at circumferentially spaced intervals are radially inwardly protruding bumps 14a. Carried upon the tire rim 11 is a pneumatic tire 17 which is adapted to be inflated by inserting air through a valve stem indicated at 18 in FIGURE 1. The tire 17 may be either of the tube or tubeless type.

For disposition at the outer side of the wheel and in overlying covering relation to the wheel body 10, as well as concealing a substantial portion of the tire rim 11, there is provided a wheel cover member 20. The cover member 20 is preferably comprised of an aluminum composition material such as aluminum or aluminum alloy. Excellent results may be obtained where the present cover is comprised of anodized aluminum.

The cover 20 includes a central crown area 21 and the crown area terminates in an annular grooved area 21a which is disposed radially outwardly of the central crown area 21. Disposed radially outwardly of the grooved area 21a is an annular rib 22 as well as an annular axially inwardly dished area 23. The dished area 23 at its radially outer side extends generally radially and axially outwardly providing the outer cover margin 24. The outer cover margin 24 at its radially outermost end is turned under and an annular generally radially inwardly axially inwardly extending flange portion 25 is provided. The annular flange portion 25 is spaced axially inwardly from the cover margin 24 and is provided with finger structure 26 at circumferentially spaced intervals.

The finger structure 26 includes a generally axially extending portion 27. In this connection it should be noted that the axially extending finger portion 27 is generally wedged shaped. The axially extending finger portion 27 also has a central recessed area which operates to divide the axial flange into three separate fingers or extensions indicated generally at 28—28 and 29. The finger 29 is adapted for engaging the rim bump 14a as shown in dotted line in FIGURE 4.

The fingers 28 are substantially identical in construction and each include an axial finger portion 28a as well as a return bent generally radially and axially outwardly extending short stiff terminal 28b which in turn terminates in a rim engaging edge 28c.

The finger 29 has a shorter axial flange portion 29a as compared to the corresponding flange portion 28a on the finger 28. The axially inner end of the flange portion 29a is return bent providing a return bent short stiff terminal 29b which terminal terminates in a bump engaging edge 29c. It should be noted that the bump engaging finger 29 is adapted to be engaged with the rim bump 14a provided on the intermediate rim flange 14 while the other fingers 28—28 are adapted to engage on circumferentially spaced opposite sides of the bump 14a.

The short stiff, terminal 29b has a shorter dimension than does the short stiff terminal 28b on the fingers 28.

The finger structure 26 may be formed from the four corners of the blank from which the cover member 20 is manufactured. Thus it will be appreciated that four relatively large finger structures 26 may be provided on the cover 20 in order to sustain the cover 20 in retained assembly on the vehicle wheel.

In order to assemble the cover 20 on the wheel the finger structures 26 must be aligned axially with respect to the bumps 14a. After the cover has been generally aligned axially with respect to the bumps the valve stem 18 is projected through a cover opening 30 so that the valve stem will be accessible from the outer side of the wheel. Then upon the application of an axially inward force the finger 29 will be radially deflected over the bump 14a until its bump engaging edge 29c is retainingly engaged against the bump at its axially inner side. During this assembly operation the rim engaging edges 28c—28c on the fingers 28—28 are deflected slightly since the intermediate rim flange inclines slightly radially outwardly along its length. In other words, as the fingers 28 are moved axially inwardly relative to the intermediate 14 the rim engaging edges 28c will be placed under tensioned engagement with the rim flange 14. It is in this manner that the cover 20 may be sustained in assembly upon the wheel.

The cover 20 may be removed from the wheel by inserting a pry-off tool underneath the radial cover flange 25 so as to disengage this cover flange 25 from rim shoulder 15a. The pry-off tool may be then projected further radially and axially inwardly and fulcrumed upon the terminal rim flange 16 to disengage the bump engaging edge 29c on the finger 29 from behind the bump and also release the rim engaging edges 28c to free the cover from the tire rim.

It will be understood that modifications and variations may be effected without departing from the scope of the novel concepts of the present invention.

I claim as my invention:

In a wheel structure including a tire rim having an intermediate rim flange provided with circumferentially spaced bumps, a one piece wheel cover member comprised of an aluminum composition, the cover member having an outer margin bottomed against the tire rim and provided with an integral underturned flange, circumferentially spaced sets of the deflectable retaining fingers provided on the axially inner end of the annular underturned flange with at least three fingers in each set including an axially outermost bump engaging finger and axially innermost rim engaging fingers on circumferentially opposite sides thereof, each of said fingers including an axial finger portion, the axially inner ends of the axial finger portions in each set being turned and provided with a series of radially and axially outwardly extending return bent portions disposed on circumferentially opposite sides of a short stiff return bent bump engaging portion and with said return bent portions terminating in radially and axially outwardly facing biting gripping edges, the edge on said short stiff return bent bump engaging portion in each set being disposed axially outwardly of the rim engaging edges and having a diameter smaller than a radially inner diameter of the intermediate rim flange and being engaged directly in edgewise engagement against the bump and with the other edges in the set having a diameter normally slightly greater than a radially inner diameter of the intermediate rim flange and being biased radially inwardly and retainingly engaged with the intermediate rim flange on circumferentially opposite sides of the bump axially inwardly of the bump engaging edge and the associated bump.

References Cited in the file of this patent

UNITED STATES PATENTS

| | | |
|---|---|---|
| 2,497,827 | Trafton | Feb. 14, 1950 |
| 2,624,640 | Lyon | Jan. 6, 1953 |
| 2,757,979 | Lyon | Aug. 7, 1956 |
| 2,804,348 | Lyon | Aug. 27, 1957 |
| 2,812,215 | Waite | Nov. 5, 1957 |
| 2,945,723 | Estes | July 19, 1960 |

FOREIGN PATENTS

| | | |
|---|---|---|
| 916,386 | Germany | Aug. 9, 1954 |
| 529,974 | Canada | Sept. 4, 1956 |
| 530,682 | Canada | Sept. 25, 1956 |
| 774,906 | Great Britain | May 15, 1957 |